(12) United States Patent
Natarajan et al.

(10) Patent No.: US 9,160,662 B2
(45) Date of Patent: Oct. 13, 2015

(54) UPLINK BUFFER STATUS REPORTING OF RELAY STATIONS IN WIRELESS NETWORKS

(75) Inventors: Balamurali N. Natarajan, Bangalore, IN (US); Suresh Kalyanasundaram, Bangalore (IN); Vinod Kumar Ramachandran, Bangalore (IN)

(73) Assignee: Google Technology Holdings LLC, Mountain View, CA (US)

( * ) Notice: Subject to any disclaimer, the term of this patent is extended or adjusted under 35 U.S.C. 154(b) by 575 days.

(21) Appl. No.: 13/212,447

(22) Filed: Aug. 18, 2011

(65) Prior Publication Data
US 2012/0044814 A1    Feb. 23, 2012

(51) Int. Cl.
| H04L 12/801 | (2013.01) |
|---|---|
| H04B 7/155 | (2006.01) |
| H04L 12/835 | (2013.01) |
| H04W 28/10 | (2009.01) |
| H04B 7/26 | (2006.01) |
| H04W 84/04 | (2009.01) |

(52) U.S. Cl.
CPC ............... *H04L 47/10* (2013.01); *H04B 7/155* (2013.01); *H04L 47/30* (2013.01); *H04W 28/10* (2013.01); *H04B 7/2606* (2013.01); *H04L 47/14* (2013.01); *H04W 84/047* (2013.01)

(58) Field of Classification Search
USPC ............ 370/315, 389, 395.1, 395.4; 455/130, 455/334, 343.1, 343.4, 343.2
See application file for complete search history.

(56) References Cited

U.S. PATENT DOCUMENTS

| 6,449,357 | B1 * | 9/2002 | Sashihara | 379/265.09 |
|---|---|---|---|---|
| 7,953,064 | B2 * | 5/2011 | Ahluwalia | 370/349 |
| 8,238,242 | B2 * | 8/2012 | Wiemann et al. | 370/231 |
| 2008/0049618 | A1 * | 2/2008 | Ishii et al. | 370/235 |
| 2010/0113055 | A1 * | 5/2010 | Iwamura et al. | 455/452.1 |
| 2010/0214988 | A1 * | 8/2010 | De Pasquale et al. | 370/328 |
| 2011/0013597 | A1 * | 1/2011 | Hwang et al. | 370/331 |
| 2011/0170495 | A1 * | 7/2011 | Earnshaw et al. | 370/329 |
| 2012/0163287 | A1 * | 6/2012 | Raaf et al. | 370/315 |
| 2012/0170508 | A1 * | 7/2012 | Sawai | 370/315 |
| 2012/0250605 | A1 * | 10/2012 | Du et al. | 370/315 |
| 2012/0307668 | A1 * | 12/2012 | Wiemann et al. | 370/252 |
| 2012/0315841 | A1 * | 12/2012 | Zhou et al. | 455/11.1 |

* cited by examiner

*Primary Examiner* — Fan Ng
(74) *Attorney, Agent, or Firm* — Lerner, David, Littenberg, Krumholz & Mentlik, LLP

(57) ABSTRACT

The present disclosure is directed to a method for reporting uplink buffer status of a relay station to a base station in a wireless network. The method includes monitoring an uplink buffer of the relay station communicating with the base station, where the uplink buffer comprises data to be transmitted from one or more user terminals to the base station. The method further includes sending an uplink buffer status report from the relay station to the base station, where the uplink buffer status report includes occupancy status information of the monitored uplink buffer and a number of user terminals having data queued up at the relay station to be transmitted to the base station.

18 Claims, 4 Drawing Sheets

UPLINK BUFFER STATUS REPORTING OF RELAY STATIONS IN WIRELESS NETWORKS

FIELD OF THE INVENTION

The present invention generally relates to buffer status reporting in wireless networks, and more particularly relates to a method for reporting uplink buffer status of a relay station to a base station in next generation wireless networks.

BACKGROUND

With the proliferation of wireless networks, today, it is possible to extend network coverage to wider areas and even reach remote locations wirelessly. The 4$^{th}$ Generation (4G) of cellular wireless standards such as LTE-Advanced (Long Term Evolution) and IEEE 802.16j aims at significantly improving the wireless communication further. The introduction of relay stations in such wireless networks is directed to improve cell edge user throughput and enhance coverage of the eNodeBs (base stations). Relay stations serve smaller coverage area than eNodeBs. An eNodeB transfers data to and from one or more relay stations, which in turn serve user terminals (UTs) located in their coverage area.

For transmitting data from the UTs to an eNodeB in the uplink, a UT sends the data via a relay station. In such a scenario, the relay station ensures the delivery of user data from the UT to the base station. In other words, the user data from the UT to be transmitted to the base station is buffered at the relay station serving the UT. Since, the base station is unaware of the number of UTs that have uplink data buffered at the relay station, it may not be able to reserve sufficient uplink resources for all the UTs as per their requirements. This can result in degraded quality of service.

In existing cellular systems, uplink buffer status reporting by UTs is quite prevalent. For example, in LTE, each UT transmits an uplink buffer status report to its serving eNodeB indicating a quantized amount of uplink data pending in the UTs' buffer for different logical channel groups. The purpose of this technique is to enable the eNodeB to give the requisite amount of uplink resources to the UTs.

Further, IEEE 802.16j/D5 (2008-05-30) describes that the exact single user information and the bandwidth requested need to be sent by the relay to the base station to enable the base station to schedule the user on the relay-user access link.

None of the foregoing techniques address issues related to uplink transmission from UTs to a base station using a relay station in a way that ensures optimal quality of service to the UTs with reduced overhead. Therefore, there exists a need for a method to uplink user data from user terminals to a base station via a relay station without the need to send the detailed information of the UTs yet ensuring that all the user terminals get acceptable quality of service.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
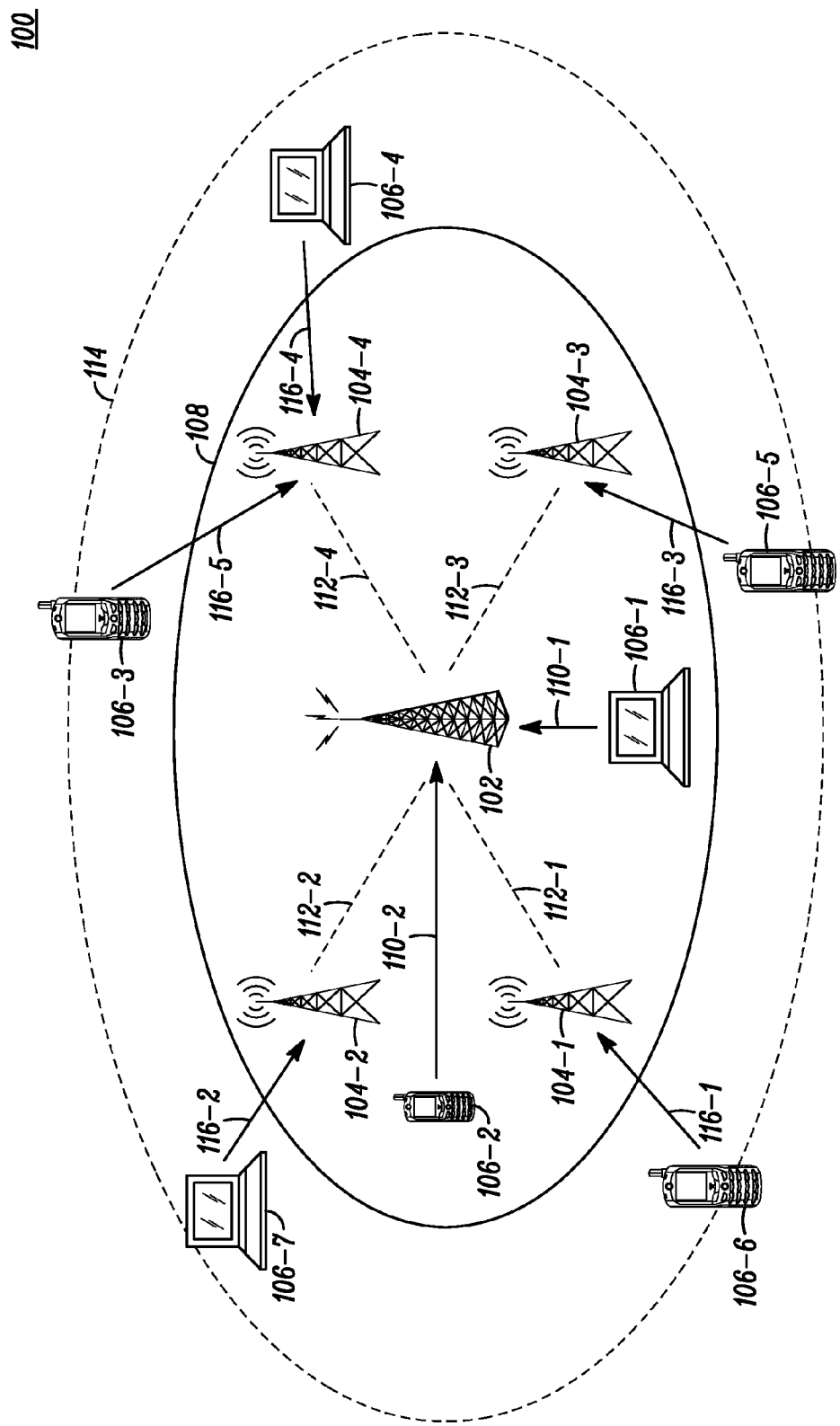
FIG. 1 shows an exemplary wireless network employing relay stations in accordance with some embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to uplink buffer status reporting. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of the relay station described herein. The non-processor circuits may include, but are not limited to, a radio receiver, a radio transmitter, signal drivers, clock circuits, power source circuits, and user input devices. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The present invention is directed to a method of reporting the uplink buffer status of a relay station to a base station in a wireless network. The method includes monitoring an uplink buffer of a relay station communicating with a base station, where the uplink buffer comprises data to be transmitted from one or more user terminals to the base station. The method further includes sending an uplink buffer status report from the relay station to the base station. The uplink buffer status report comprises occupancy status information of the monitored uplink buffer and a number of user terminals having data queued up at the relay station to be transmitted to the base station.

On receiving the uplink buffer status report from the relay station, the base station schedules resource blocks, based on the uplink buffer status report, for the relay station to transmit data from the user terminals on the uplink. Thereafter, the base station starts accepting the data from the user terminals received through the relay station.

Turning to FIG. 1, there is shown a wireless network 100 operating in accordance with a next generation wireless technology such as 3GPP LTE, LTE-Advanced, WiMax, IEEE 802.16j, etc. The network 100 includes a base station 102, relay stations 104-1 to 104-4 (collectively referred to as relay stations 104), and user terminals 106-1 to 106-7 (collectively referred to as user terminals 106). It is to be understood that the network 100 may also include routers, bridges, switches, hubs, base station controller, and other network entities that support the operation of the network 100. Further, the user terminals 106 can be any portable device such as a mobile phone, laptop, PDA, palmtop, navigation device, and the like.

The base station 102 provides network access to all user terminals that fall within the network coverage range (108) of the base station 102. In one embodiment, the base station 102 directly serves the user terminals 106-1 and 106-2, as shown by wireless links 110-1 and 110-2. The base station 102 increments its network coverage range with the help of the relay stations 104 that are connected to the base station 102 through a wired infrastructure or wirelessly, as shown by links 112-1 to 112-4. The relay stations 104 serve the user terminals 106-3 to 106-7 falling outside the network coverage range (108) of the base station 102. In other words, the relay stations 104 provide an extended network coverage range (114) to the base station 102.

In one embodiment, the user terminals 106-1 and 106-2 directly communicate with the base station 102 to send and receive data from any device present in the network 100. Therefore, the base station 102 is always aware of data usage and requirements of the user terminals 106-1 and 106-2. However, the user terminals 106-3 to 106-7 communicate with relay stations 104, which in turn communicate with the base station 102 to convey data usage and requirements of the user terminals 106-3 to 106-7. Therefore, the base station 102 would benefit with input from the relay stations 104 to schedule communication resources for accepting data from the user terminals 106-3 to 106-7. In other words, the relay stations 104 can act as an intermediary between the base station 102 and the user terminals 106-3 to 106-7.

Figure 2:
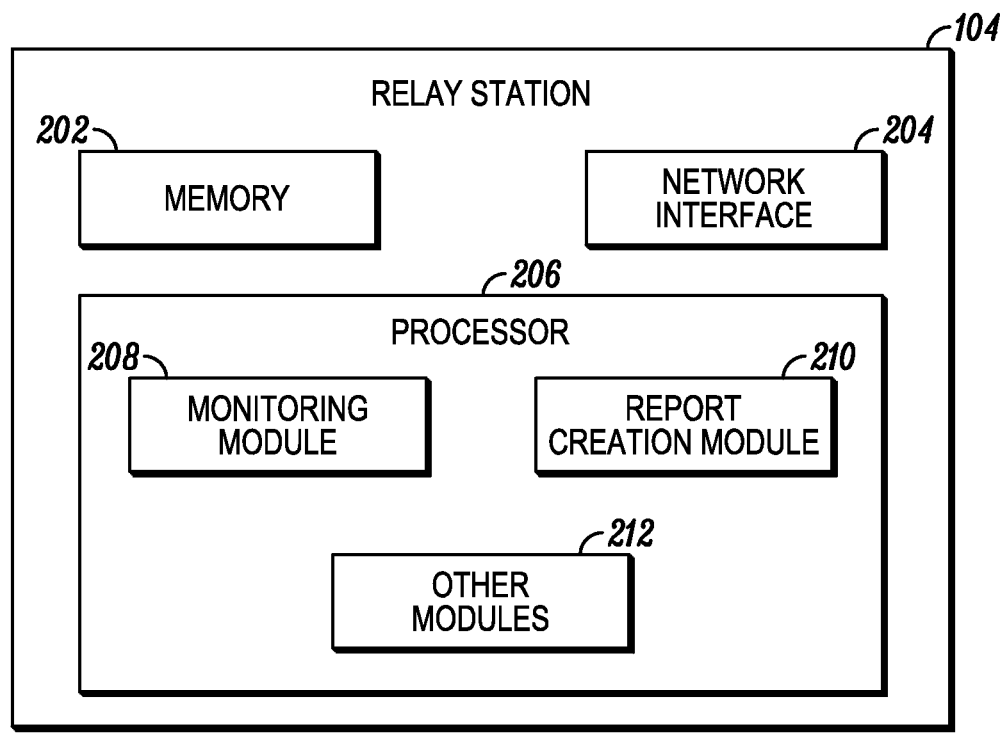
FIG. 2 shows an example of a relay station used in a wireless network in accordance with some embodiments of the invention.

FIG. 2 shows a block diagram of the relay station 104 in accordance with an embodiment of the invention. FIG. 2 is being explained with reference to the network 100 illustrated in FIG. 1. The relay station 104 comprises various modules dedicated to perform specific tasks. In one embodiment, the relay station 104 includes a memory 202, a network interface 204, and a processor 206 coupled to the memory 202. The memory 202 stores user data and system information of the relay station 104. The network interface 204 enables the relay station 104 to interface and communicate with network entities such as base stations, user terminals, controllers, etc. present in the network 100. The processor 206 is the main controller that performs all processing, computing, and decision-making tasks of the relay station 104.

The processor 206 includes a monitoring module 208, a report creation module 210, and other modules 212. These modules have their specific functions, and are interconnected to provide requisite information to one another. In one embodiment, the monitoring module 208 monitors the occupancy status of an uplink buffer of the relay station 104. It is to be noted that the uplink buffer can be a part of the memory 202. The uplink buffer temporarily stores uplink data received from the user terminals 106 that is transmitted to the base station 102. Since the uplink buffer of the relay station 104 has a limited storage capacity, the monitoring module 208 keeps tracking occupancy status of the uplink buffer to check for buffer overloading that may lead to data loss. The monitoring module 208 checks the buffer occupancy against a reference threshold level. When the buffer occupancy exceeds the threshold level, the relay station 104 is triggered to send an uplink buffer status report to the base station 102. However, the pending data for the user terminals 106 is only transmitted to the base station 102 after the base station 102 has reserved sufficient uplink resources. In one embodiment, the monitoring module 208 may also check if the uplink buffer is sparsely loaded.

The report creation module 210 performs the task of creating the uplink buffer status report for the base station 102. In one embodiment, sending of the uplink buffer status report is either time triggered or event triggered. The report is said to be time triggered when the relay station 104 sends the uplink buffer status report to the base station 102 after a particular time interval. In other words, the relay station 104 sends the uplink buffer status report to the base station 102 periodically. On the other hand, the report is said to be event triggered when the relay station 104 sends the uplink buffer status report to the base station 102 after receiving an alert from the monitoring module 208. The monitoring module 208 generates the alert when the uplink buffer is either overloaded or sparsely loaded, as described above. It is to be noted that there may be some other events when the monitoring module 208 generates an alert such as arrival of new data from an existing or anew user terminal at the relay station.

The report creation module 210 prepares the uplink buffer status report based on the current occupancy status of the uplink buffer. The occupancy status refers to data storage space occupied by pending data in the uplink buffer. For example, if the total data storage capacity of the uplink buffer is 100 GB, and the data stored in the buffer is 25 GB, then the occupancy status of the uplink buffer is said to be 25%. In one embodiment, the uplink buffer status report includes an amount of data pending for each of the logical channels (or flows) of each of the user terminals in the uplink buffer. However, for bandwidth conservation, the report creation module 210 can include the amount of data pending for each logical channel group consisting of logical channels with similar QoS (Quality of Service) requirements, of each of the user terminals.

The uplink buffer status report also indicates a total number of user terminals having data pending at the relay station 104 to be transmitted to the base station 102. From all the user terminals connected to the relay station 104, the relay station 104 determines the user terminals that have uplink data for the base station 102.

Figure 3:
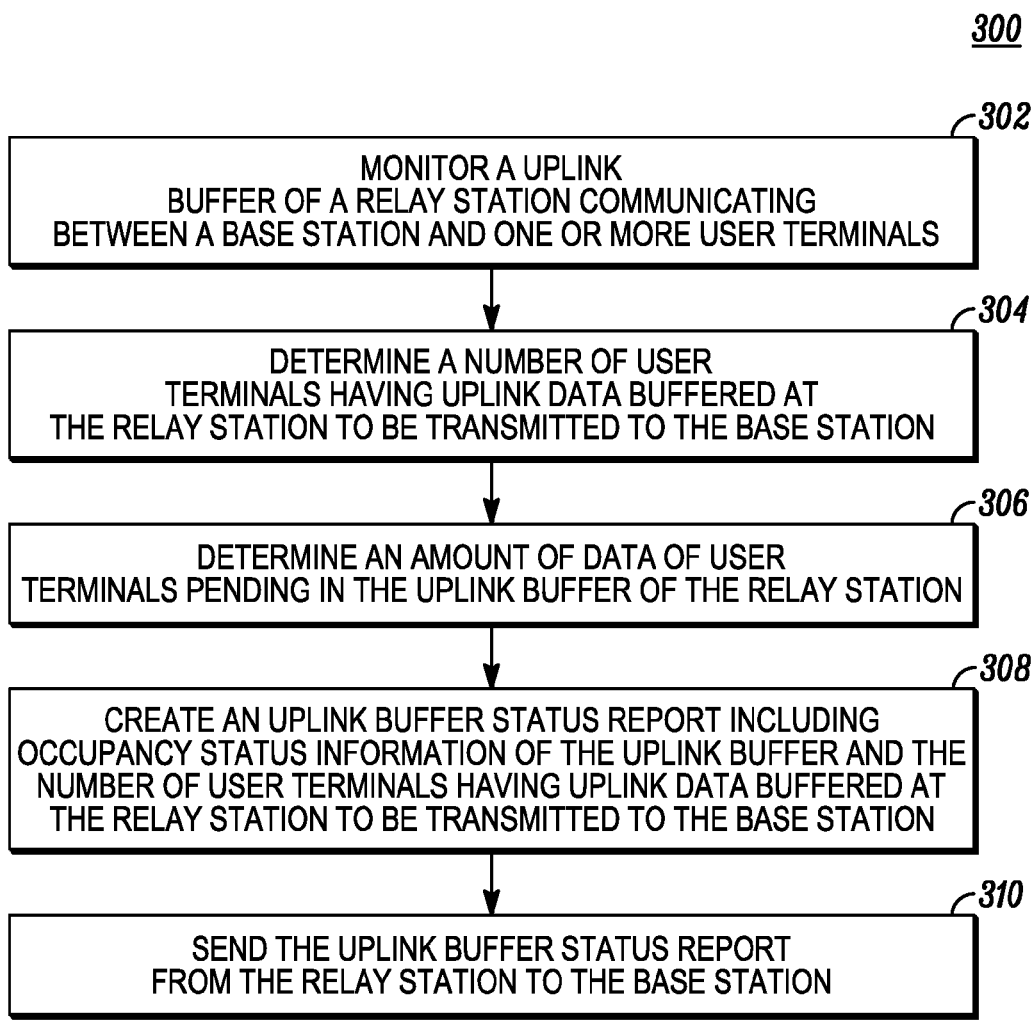
FIG. 3 is a flow chart for a method of sending an uplink buffer status report from a relay station to a base station in accordance with some embodiments of the invention.

FIG. 3 illustrates a flow chart of a method 300 for sending an uplink buffer status report from a relay station to a base station. The method 300 is explained with reference to the network 100 in FIG. 1 and the relay station 104 in FIG. 2. The method includes monitoring (302) an uplink buffer of a relay station, for instance the relay station 104-4 communicating between the user terminals 106-3, 106-4 and the base station 102. The relay station 104-4 constantly tracks the occupancy status of its uplink buffer to check if the buffer is overloaded or sparsely loaded. Based on the occupancy status of the uplink buffer, the relay station 104-4 decides either to schedule the user terminals 106-3, 106-4 to send more data or not for the base station 102, and also begins sending the uplink buffer status report to obtain uplink resources to transmit the pending data to the base station 102.

The relay station 104-4 determines (304) a number of user terminals having uplink data buffered at the relay station 104-4 to be transmitted to the base station 102. For example, consider that the relay station 104-4 has 5 user terminals connected to it. Out of these 5 user terminals, only 2 of the user terminals have uplink data for the base station 102 buffered at the relay station 104-4. Therefore, the relay station 104-4 will communicate to the base station 102 that 2 user terminals have uplink data.

Then, the relay station 104-4 determines (306) the amount of uplink data pending in the uplink buffer of the relay station 104-4. For example, the two user terminals 106-3 and 106-4 may have 1 GB and 400 MB of uplink data respectively pending in uplink buffer of the relay station 104-4. In one embodiment, the relay station 104-4 also determines and communicates to the base station 102 the type of uplink data received from the user terminals 106-3 and 106-4. For example, the user terminals 106-3 may have transmitted audio-video content, while the user terminal 106-4 may have transmitted text/image content for the base station 102.

Next, the relay station 104-4 creates (308) an uplink buffer status report including the occupancy status of the uplink buffer and the number of user terminals having data pending in the uplink buffer of the relay station 104-4. The uplink buffer status report includes necessary information for the base station 102 to schedule sufficient resources for receiving the uplink data from the user terminals 106-3 and 106-4 buffered at the relay station 104-4, as required. For example, the uplink buffer status report may include the exact snapshot of the uplink buffer indicating the amount of data pending for each of the user terminals 106-3 and 106-4. The uplink buffer status report may also include data type of the uplink data provided by the user terminals 106-3 and 106-4.

Thereafter, the relay station 104-4 sends (310) the uplink buffer status report to the base station 102. In one embodiment, the relay station 104-4 sends the uplink buffer status report to the base station 102 either time triggered to event triggered, as described above.

Figure 4:
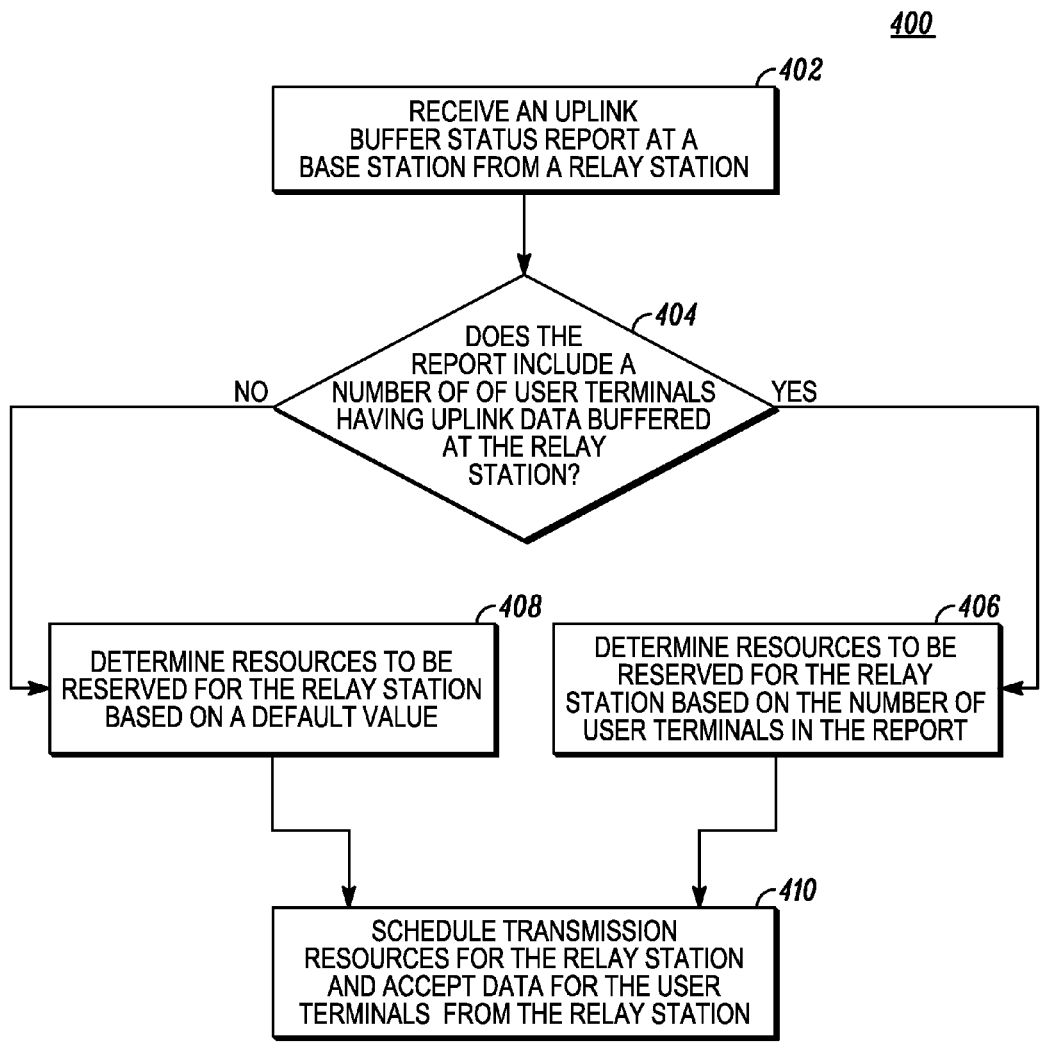
FIG. 4 is a flow chart for a method of receiving an uplink buffer status report at a base station from a relay station in accordance with some embodiments of the invention.

FIG. 4 illustrates a flow chart of a method 400 for receiving an uplink buffer status report at a base station from a relay station. The method 400 is explained with reference to the network 100 in FIG. 1 and the relay station 104 in FIG. 2. The method 400 includes receiving (402) an uplink buffer status report from the relay station 104-4. In one embodiment, the base station 102 receives the uplink buffer status report from the relay station 104-4 either periodically or at random intervals based on the occupancy status of the uplink buffer. In an alternate embodiment, the relay station 104-4 sends the uplink buffer status report to the base station 102 when a new user terminal having uplink data for the base station 102 arrives at the relay station 104-4.

On receiving the uplink buffer status report, the base station 102 checks (404) whether the report includes a number of user terminals having uplink data for the base station 102 buffered at the relay station 104-4. It may be possible that the relay station 104-4 only indicates the amount of uplink data pending in the uplink buffer status report to the base station 102.

If the uplink buffer status report includes the number of user terminals having uplink data for the base station 102 buffered at the relay station 104-4, then the base station determines (406) the communication resources to be scheduled to receive the uplink data based on the number of user terminals. On the other hand, if the uplink buffer status report does not include the number of user terminals having uplink data for the base station 102 buffered at the relay station 104-4, then the base station determines (408) the communication resources to be scheduled to receive the uplink data based on a default value for the number of user terminals buffered at the relay station 104-4.

As the base station 102 has both directly and indirectly connected user terminals (via relay stations), it has to ensure that all the user terminals are treated fairly and accordingly allocate resource blocks. The base station 102 is itself aware of the number of directly connected user terminals having uplink data, and gets to know the number of indirectly connected user terminals having uplink data by the uplink buffer status report received from the one or more relay stations 104 in the network 100. In one embodiment, the base station 102 schedules the resource blocks for the relay stations 104 based on an equal-fairness scheduler. The equal-fairness scheduler schedules a proportion M/(M+N) of the total available resource blocks for the relay stations 104, where N is the number of directly connected user terminals having uplink data and M is the number of indirectly connected user terminals having uplink data. In case, the exact value of M is not known to the base station 102, the base station 102 assumes a default value. In one embodiment, M is assumed to be equal to N, and therefore, equal number of resource blocks will be scheduled for both directly connected and indirectly connected user terminals.

After scheduling the resource blocks for the user terminals, the base station 102 accepts (410) the uplink data from the user terminals at a rate set by the resource blocks available to each of the user terminals.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:
1. A method comprising:
monitoring using one or more processors, an uplink buffer of a relay station communicating with a base station, wherein the uplink buffer comprises data to be transmitted from one or more user terminals to the base station;

sending using the one or more processors, an uplink buffer status report from the relay station to the base station, the uplink buffer status report comprises occupancy status information of the monitored uplink buffer and a number of user terminals having data pending at the relay station for transmission to the base station; and reserving, using the one or more processors, a given amount of uplink resources from the uplink buffer on the occupancy status information, wherein the given amount of uplink resources is configured to optimize a current load of the uplink buffer when transmitting the data pending, wherein based on the occupancy status of the uplink buffer, the relay station decides for the base station either to schedule the user terminals to send more data or not without the BS knowing how many user terminals are currently coupled to the relay station.

2. The method of claim 1, wherein the relay station sends the uplink buffer status report to the base station after a periodic time trigger indicating that a periodic time interval has past.

3. The method of claim 1, wherein the relay station sends the uplink buffer status report to the base station when occupancy of the uplink buffer reaches a threshold level or when occupancy of the uplink buffer changes by a threshold level.

4. The method of claim 1, wherein the relay station sends the uplink buffer status report to the base station when the relay station receives data from a new user terminal to be transmitted to the base station.

5. The method of claim 1, wherein the occupancy status information specifies an amount of data pending in the uplink buffer to be transmitted from the relay station to the base station.

6. The method of claim 1, wherein the uplink buffer status report specifies an amount of data pending for each logical channel group and a number of user terminals that have their data for that particular logical channel group.

7. The method of claim 1, wherein the uplink buffer status report specifies an amount of data pending for each logical channel and a number of user terminals that have their data for that particular logical channel.

8. A method comprising:
receiving using one or more processors an uplink buffer status report at a base station from a relay station, wherein the uplink buffer status report comprises occupancy status information of the uplink buffer of the relay station indicating a number of user terminals having data pending for transmitted to the base station;

reserving, using the one or more processors, a given amount of communication resources, based on the occupancy status informayion, by the base station for the relay station to transmit the data pending for transmission from the user terminals on the uplink buffer, wherein the given amount of communication resources is configured to optimize a current load of the uplink buffer when the data pending, wherein based on the occupancy status of the uplink buffer, the relay station decides for the base station either to schedule the user terminals to send more data or not without the BS knowing how many user terminals are currently coupled to the relay station; and accepting, using the one or more processors, the pending data from the user terminals received at the base station through the relay station.

9. The method of claim 8, wherein the base station receives the uplink buffer status report from the relay station at a time trigger indicating that a periodic time interval has past.

10. The method of claim 8, wherein the buffer occupancy status information specifies an amount of data pending to be transmitted from the relay station to the base station.

11. The method of claim 8, wherein the base station ensures fair scheduling of transmission resources by considering the number of user terminals that have data pending at the relay station to be transmitted to the base station connected to the relay station, and considering the user terminals that are directly connected to the base station and having data pending to be transmitted to the base station.

12. A relay station comprising:
a network interface to communicate with a base station and one or more user terminals;
a memory including an uplink buffer, wherein the uplink buffer stores data from the one or more user terminals pending to be transmitted to the base station; and
a processor coupled with the memory and the network interface, wherein the processor is configured to:
monitor an occupancy status of the uplink buffer;
determine a number of user terminals having data pending to be transmitted to the base station;
determine an amount of data transmitted by each of the determined number of user terminals;
send an uplink buffer status report to the base station using the network interface, wherein the uplink buffer status report comprises occupancy status information of the uplink buffer and the number of user terminals having data pending for transmission in the uplink buffer to the base station, and
reserve a given amount of uplink resources from the uplink buffer based on the occupancy status information, wherein the given amount of uplink resources is configured to optimize a current load of the uplink buffer when transmitting the data pending, wherein based on the occupancy status of the uplink buffer, the relay station decides for the base station either to schedule the user terminals to send more data or not without the BS knowing how many user terminals are currently coupled to the relay station.

13. The relay station of claim 12 sends the uplink buffer status report to the base station either periodically or when occupancy of the uplink buffer reaches a threshold level or when occupancy of the uplink buffer changes by a threshold level.

14. The relay station of claim 12, wherein the uplink buffer status report indicates a number of user terminals that have data to be sent to the base station.

15. The relay station of claim 12 further determines the type of data to be transmitted to the base station by the user terminals.

16. The relay station of claim 12, wherein the occupancy status information further comprises the amount of data pending at the uplink buffer of the relay station.

17. The relay station of claim 12 sends the pending data to the base station after the base station schedules resource blocks for each of the user terminals based on the uplink buffer status report.

18. The relay station of claim 12 communicates with the base station and the one or more user terminals wirelessly in accordance with at least one of a 3GPP LTE (Long Term Evolution) standard, LTE-Advanced standard, UMTS (Universal Mobile Telecommunications System) standard, and GSM (Global System for Mobile Communications) standard.

* * * * *